United States Patent [19]

Miyamoto et al.

[11] Patent Number: 4,561,752
[45] Date of Patent: Dec. 31, 1985

[54] METERING DEVICE OF A CAMERA

[75] Inventors: Hidenori Miyamoto, Ichikawa; Takashi Saegusa, Kawasaki, both of Japan

[73] Assignee: Nippon Kogaku K.K., Tokyo, Japan

[21] Appl. No.: 629,897

[22] Filed: Jul. 11, 1984

[30] Foreign Application Priority Data

Jul. 26, 1983 [JP] Japan .............................. 58-136160

[51] Int. Cl.[4] .............................................. G03B 7/08
[52] U.S. Cl. .................................... 354/432; 354/446
[58] Field of Search ............... 354/429, 431, 432, 433, 354/434, 446

[56] References Cited

U.S. PATENT DOCUMENTS 4,429,969 2/1984 Saegusa ............................... 354/432
4,448,506 5/1984 Saegusa et al. ...................... 354/431

Primary Examiner—Russell E. Adams
Attorney, Agent, or Firm—Fitzpatrick, Cella, Harper & Scinto

[57] ABSTRACT

A metering device of a camera comprises first metering means for effecting metering while dividing an object into a plurality of areas and producing a first metering output which determines the exposure of the object on the basis of a plurality of photoelectric outputs corresponding to the areas, second metering means for metering the central partial area of the object and producing a second metering output corresponding to the partial area, an operating member operated by the operator to stop down the stop of a photo-taking lens which is in its open condition to a preset aperture value, and change-over means including means responsive to the operating member and selecting the first metering output when the stop of the photo-taking lens is in its open condition and selecting the second metering output when the stop has been stopped down to the preset aperture value.

8 Claims, 5 Drawing Figures

METERING DEVICE OF A CAMERA

BACKGROUND OF THE INVENTION

1. Field of the Invention

This invention relates to a metering device in a TTL type camera provided with a multi metering circuit for effecting metering while dividing a photo-taking picture plane into a plurality of metering areas.

2. Description of the Prior Art

A metering device of a camera provided with a so-called multi metering circuit designed to divide an object or a photo-taking picture plane conjugate with a film surface (hereinafter simply referred to as the "photo-taking picture plane") into a plurality of metering areas and obtain a proper metering output of the entire photo-taking picture plane from photoelectric outputs for the lights of the divided metering areas so that proper exposure may be obtained even in a special light ray condition such as counter-light or spot light is known. For example, the metering device of U.S. Pat. No. 4,306,787 is designed such that when normal photography is to be effected, an open corrected value of the central portion of the photo-taking picture plane corresponding to the combination of the open F-value of the lens and the focal length of the lens is added to the open metering level of the central portion and another open corrected value of the marginal portion of the picture plane corresponding to the combination of the open F-value of the lens and the focal length of the lens is added to the open metering level of the marginal portion to thereby determine a proper exposure value and exposure is controlled on the basis of the proper exposure value. However, correction of the open F-values of the central portion and the marginal portion of the photo-taking picture plane is considerably complicated.

On the other hand, in many single lens reflex cameras, an operating lever or button operated by the operator to manually stop down the stop to a preset aperture value is provided externally of the camera to enable the depth of field to be confirmed. When this stop-down operating member is operated, the condition of the light passing through the lens to the marginal portion of the photo-taking picture plane becomes greatly different between the time of stop opening and the time of stop-down. Where the so-called stop-down metering in which metering is effected with the stop being stopped down to a preset value (the actual photographing condition) by a multi metering circuit device is effected, the corrected value for obtaining a proper exposure value must be not the corrected value for the aforementioned open F-value but the stop-down corrected value corresponding to each aperture value, namely, the difference between the calculated quantity of light for each aperture value and the quantity of light on the photo-taking picture plane passed through the stop of the lens.

However, that stop-down corrected value is not one corresponding to the combination of the open F-value of the lens as in the case of the so-called open metering in which metering is effected with the stop being open and the focal length of the lens related to the photographing angle of view, but the combination of the varying aperture value and the focal length. Therefore, in cameras of the conventional metering type, the stop-down corrected value corresponding to each interchangeable lens or each aperture value must be determined and thus, the circuit becomes much more complicated and larger than in the case of open metering only, and this is contrary to the tendency of cameras toward compactness and light weight and moreover leads to expensiveness of cameras.

SUMARRY OF THE INVENTION

It is an object of the present invention to overcome the above-noted disadvantages peculiar to the prior-art metering device and to provide a metering device of a camera for making a proper metering output to obtain proper exposure even when metering is effected in a condition in which the stop of the photo-taking lens is stopped down by operating a stop-down operating member.

The metering device of the present invention is provided with first metering means for making photoelectric outputs corresponding to the lights from the various areas of an object divided into a plurality of areas from a light passed through a photo-taking lens and producing a proper metering output of the entire photo-taking picture plane on the basis of said photoelectric outputs, second metering means for producing a metering output corresponding to the light of a determined area of the photo-taking picture plane, a stop-down operating member operated to arbitrarily stop down the stop of the photo-taking lens to a preset aperture value prior to photographing, detecting means for detectng the displacement of the operating member, and change-over means capable of changing over the first metering means and the second metering means in response to the detecting means, and is designed such that metering can be effected by the first metering means when the operating member is in a stop opening position and metering can be effected by the second metering means when the operating member is in a stopping-down position.

It is desirable that said determined area to be metered by said second metering means corresponds to a substantially central area of the photo-taking picture plane or to an entire area of the same. In a case where said determined area corresponds to the entire area of the photo-taking picture plane, so-called averaged light metering or center-weighted metering is applicable.

The invention will become more fully apparent from the following detailed description thereof taken in conjunction with the accompanying drawings.

DESCRIPTION OF THE PREFERRED EMBODIMENT

Figure 1:
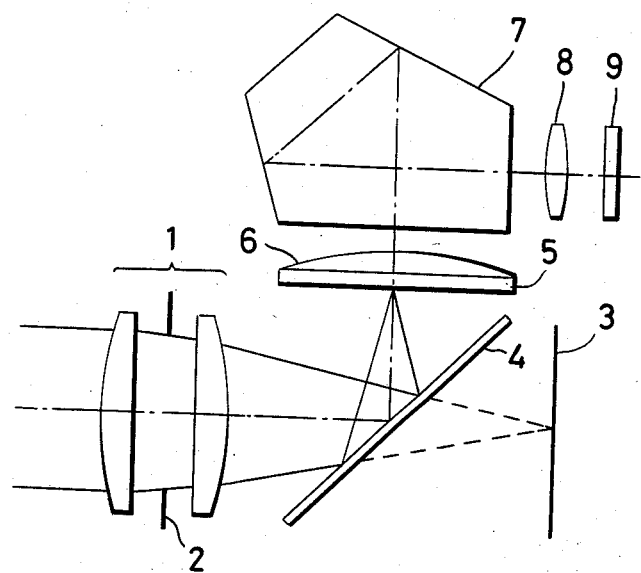
FIG. 1 shows the arrangement of the optical system of a camera for carrying out the present invention.
Figure 2:
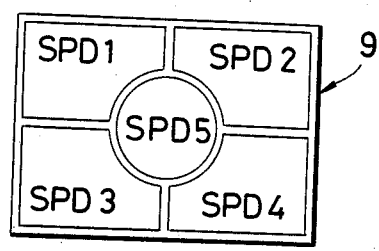
FIG. 2 is a plan view of the light-receiving portion of FIG. 1.

FIG. 1 shows the arrangement of an optical system used in an embodiment of the present invention. A light passed through a stop 2 in an objective lens 1 travels toward a film surface 3, but it is reflected by a movable mirror 4 provided on the photo-taking optical path and the object image is formed on a focus screen 5. The light from this focus screen 5 may be observed through a condenser lens 6 and a pentagonal roof prism 7. Also, part of the light reaches a light-receiving portion 9 through an imaging lens 8, and the object image on the focus screen 5 is re-imaged on the light-receiving portion by the imaging lens 8. The light-receiving portion 9, as shown in FIG. 2, is comprised of five photodiodes SPD1-SPD5 so as to divide the photo-taking picture plane on the focus screen 5 conjugate with the film surface 3 into a plurality of metering areas. These five photodiodes SPD1-SPD5 are formed in the shape of mosaic, and the marginal area of the photo-taking picture plane is metered while being divided by four photodiodes SPD1-SPD4 and the central area is metered by one photodiode SPD5 disposed at the center of the photo-taking picture plane.

Figure 3:
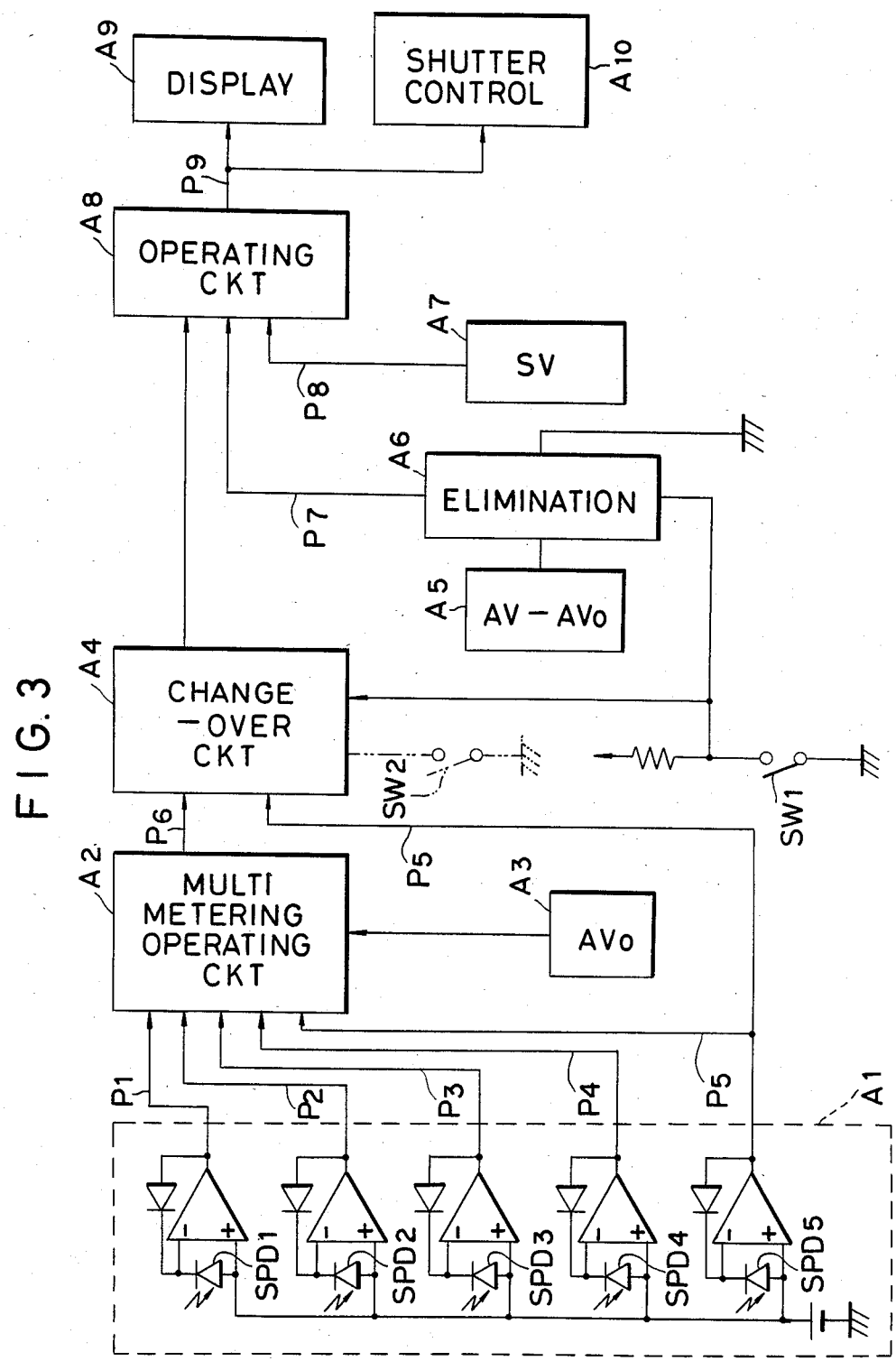
FIG. 3 is a block diagram showing an embodiment of the present invention.

FIG. 3 is a block diagram showing the embodiment of the present invention. A metering circuit A1 encircled by a broken line includes said five photodiodes SPD1-SPD5, which put out photoelectric outputs P1-P5, respectively, corresponding to the lights of the divided metering areas to a multi metering operating circuit A2 through operational amplifiers.

On the other hand, in a camera of the so-called TTL open metering type as shown in FIG. 1 wherein the light passed through the open aperture of the photo-taking lens 1 is metered in the focal plane of the photo-taking lens or a plane conjugate therewith, the quantity of light reaching the light-receiving portion 9 is limited by the open aperture diameter of the lens and further, the quantity of light in the marginal portion of the photo-taking picture plane is decreased by vignetting, cosine four arithmetic rules, etc. Accordingly, the photoelectric outputs P1-P5 in the metering areas of the photo-taking picture plane are reduced by an amount corresponding to the open aperture value $AV_0$ of the lens relative to the object brightnesses $BV_1$-$BV_5$ corresponding to the divided metering areas and further, the influence of the vignetting or the like which is negligibly small in the central metering area becomes great in the marginal portion of the photo-taking picture plane and therefore, in the marginal area, the output level is reduced by the amount of decrease in quantity of light (the amount of open correction) $\gamma$. Accordingly, the TTL open metering outputs P1-P5 of the divided areas are:

$$P_1 = BV_1 - AV_0 - \gamma \quad (1)$$

$$P_2 = BV_2 - AV_0 - \gamma \quad (2)$$

$$P_3 = BV_3 - AV_0 - \gamma \quad (3)$$

$$P_4 = BV_4 - AV_0 - \gamma \quad (4)$$

$$P_5 = BV_5 - AV_0 \quad (5)$$

Now, the multi metering operating circuit A2 receives as inputs the above-mentioned TTL open metering outputs P1-P5 and also receives from an information setting circuit A3 the open aperture value information $AV_0$, etc. as the information for the correction of the open F-value and thus, correction of the amount of open correction $\gamma$ and of the open F-value is effected. The method of correction is disclosed in the aforementioned U.S. Pat. No. 4,306,787 and is already known and therefore need not be described in detail herein.

The multi metering operating circuit A2 receives the photoelectric outputs P1-P5 in the open aperture state from the metering circuit A1 and the open aperture value information $AV_0$ from the information setting circuit A3 and suitably processes the photoelectric outputs P1-P5, and puts out the following proper metering output P6:

$$P_6 = B \text{ Vans} - AV_0 \quad (6),$$

where B Vans is a proper brightness value operated in the circuit A1 with the amount of open correction $\gamma$ for the marginal metering area in the open metering added thereto. The circuit A1 and the circuit A2 together constitute a multi metering circuit. The process content of the circuit A2 is disclosed in U.S. application Ser. No. 123,209 filed on Feb. 21, 1980 by the applicant and U.S. Pat. No. 4,412,730 and therefore need not be described in detail herein.

The proper metering output P6 from the circuit A2 and the photoelectric output (central metering output) P5 from the photodiode SPD5 are put out to a change over-circuit A4 controlled by the change-over signal from a switch SW1. This switch SW1 operates in response to a stop-down operating member which will later be described in detail, and when the switch SW1 is in its ON position, the stop is stopped down to a predetermined preset aperture value and at the same time, the stop-down metering output (photoelectric output) P5 of the photodiode SPD5 corresponding to the light passed through the stopped down aperture stop is put out to a subsequent operating circuit A8 through the change-over circuit A4. Also, when the switch SW1 is in its OFF position, the proper metering output P6 from the circuit A2 is put out to the operating circuit A8 through the change-over circuit A4.

Further, when the switch SW1 is in its OFF position, the preset aperture information P7 of an aperture ring, not shown, is put out from a second information setting circuit A5 through an elimination circuit A6. The preset aperture information P7 is expressed by the following equation:

$$P_7 = AV - AV_0 \quad (7),$$

where AV is the preset aperture value and $AV_0$ is the open aperture value and accordingly, the output P7 corresponds to the number of stop-down steps. Also, when the switch SW1 is in its ON position, due to the action of the elimination circuit A6, $$P_7 = 0 \quad (8)$$

and the output P7 is eliminated.

Further, film speed information P8 is put out from a third information setting circuit A7.

$$P_8 = SV \quad (9),$$

where SV is an APEX value representing the film speed.

In the operating circuit A8, the following APEX operation is carried out for the output P5 of the change-over circuit A4 (the photoelectric output of SPD5 in the stop-down metering) or P6 (the output of the multi metering operating circuit A2), the output P7 of the second information setting circuit A5 and the output P8 of the third information setting circuit A7:

$$P_9 = (P_5 \text{ or } P_6) - P_7 + P_8 \quad (10)$$

Now, when the switch SW1 is in its OFF position and the ordinary open metering is to be effected, the output of the change-over circuit A4 is the proper metering output P6. Accordingly, from equations (6), (7) and (9), equation (10) becomes )

$$P9 = B\ Vans - AV_0 - (AV - AV_0) + SV \quad (11)$$

and from this equation (11), there is obtained the following equation:

$$P9 = B\ Vans + SV - AV\ (= T\ Vans)$$

and this is the shutter speed (T Vans) during the multi metering.

Also, when the switch SW1 is in its ON position, the output of the change-over circuit A4 becomes P5 and the output P7 of the second information setting circuit A5 becomes 0 (zero) due to the action of the elimination circuit A6. Further, the aperture changes from its open state ($AV_0$) to its stopped-down state (AV) and therefore, from equation (5), $$P_5 = BV_5 - AV \quad (12).$$

Consequently, $$P9 = (BV_5 - AV) - 0 + SV(= TV_5) \quad (13)$$

and there is obtained a shutter speed based on the output of only the central photodiode SPD5.

The output P9 of the operating circuit A8 is displayed as the shutter speed through a conventional display circuit A9, and the shutter speed is controlled on the basis of this output P9 through a conventional shutter control circuit A10.

Figure 4:
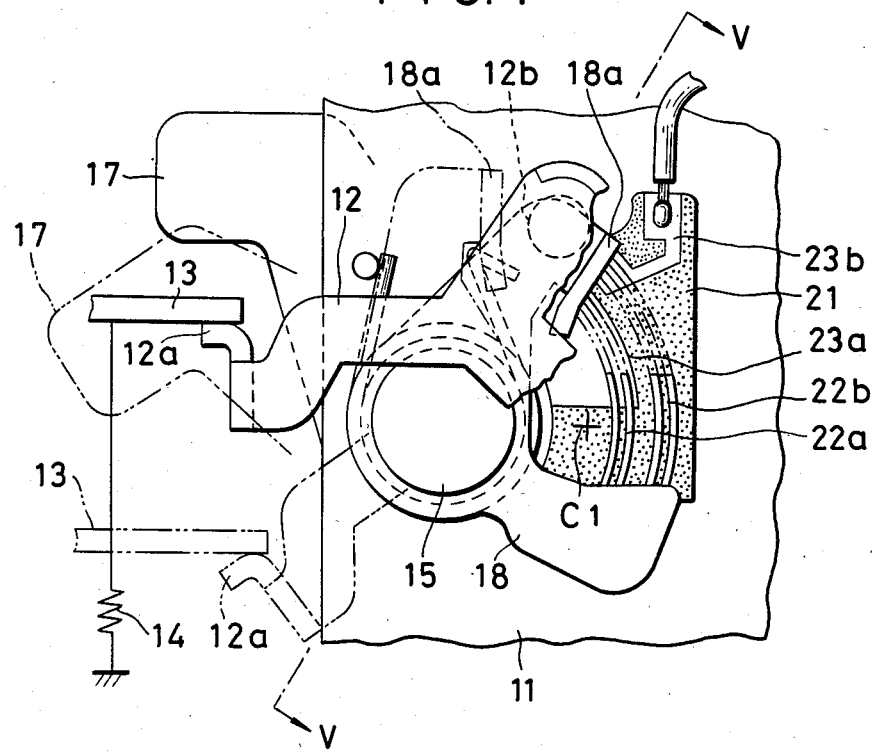
FIG. 4 is a side view showing a switch structure forming an essential portion of the present invention.
Figure 5:
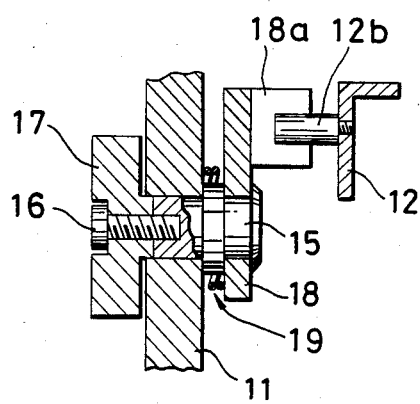
FIG. 5 is a cross-sectional view taken along line V—V of FIG. 4.

An embodiment of the stop-down switch portion is shown in FIGS. 4 and 5. A stop driving lever 12 supported for rotation about the center of rotation $C_1$ near the unshown lens mount of the housing 11 of the camera body has its bent end portion 12a engaged with a stop driving lever 13 provided near the mount of the lens barrel and normally holds the lever 13 in its position indicated by solid line against the biasing force of a tension spring 14. In this condition, the stop 2 (see FIG. 1) of the photo-taking lens is placed in its open state. The driving lever 12 is so operatively associated with a conventional mirror driving mechanism, not shown, that it pivots counter-clockwise as viewed in FIG. 4 when the movable mirror 4 is moved up and that it pivots clockwise against the biasing force of the tension spring 14 when the movable mirror 4 is moved down, thereby varying the stop aperture through the lever 13 of the lens side.

On the other hand, in the camera housing 11, there is provided a rotary shaft 15 which extends through a side wall thereof, and a stop-down operating lever 17 is fixed to one end of the rotary shaft 15 by means of a small screw 16 and a switch lever 18 is integrally fixed to the other end of the rotary shaft 15. This switch lever 18 is biased clockwise by a coil torsion spring 19. A bent portion 18a formed on one arm of the switch lever 18 bears against an engaging pin 12b projectedly provided on the lever 12 so that it rotates the lever 12 counter-clockwise about the center of rotation $C_1$ when the switch lever 18 rotates counter-clockwise against the biasing force of the spring 19. On the other arm of the switch lever 18, there is provided a pair of switch brushes 22a and 22b adapted to slide on an insulative switch base plate 21.

On the base plate 21, patterns 23a and 23b of a good electrical conductor are formed on the tracks on which the brushes 22a and 22b slide. One brush 22a is designed to slide on the pattern 23a while always being in contact therewith, and the other brush 22b is designed to contact the other pattern 23b at the end of the counter-clockwise rotation of the switch lever 18 and thereby conduct. Said other pattern 23b is connected to the change-over circuit A4 and the elimination circuit A6 in FIG. 3. The base plate 21, the brushes 22a, 22b and the patterns 23a, 23b together constitute the switch SW1 shown in FIG. 3.

In this switch structure, the switch lever 18 is normally in the position indicated by solid line due to the biasing force of the coil torsion spring 19 and the brush 22b is not in contact with the pattern 23b. Accordingly, the switch SW1 is in its OFF position and the change-over circuit A4 intercepts the metering output P5 of the photodiode SPD5 and supplies the output P6 of the multi metering operating circuit A2 to the operating circuit A8. Also, the aperture preset information P7 corresponding to the number of stop-down steps is supplied from the second information setting circuit A5 to the operating circuit A8. Thus, in the operating circuit A8, the shutter speed during the multi metering as already described is operated from the preset information P7, the film speed information P8 and the multi metering output P6.

On the other hand, in the case of stop-down metering, when the operating lever 17 is rotated counter-clockwise about the rotary shaft 15, the switch lever 18 integrally coupled to the lever 17 through the rotary shaft 15 is rotated counter-clockwise against the biasing force of the spring 19. This counter-clockwise rotation of the switch lever 18 causes the bent portion 18a of one arm thereof to bear against the engaging pin 12b of the driving lever 12 and rotate the lever 12 counter-clockwise independently of a mirror driving mechanism, not shown. Following the counter-clockwise rotation of the lever 12, the driving lever 13 of the lens side is moved down by the biasing force of the tension spring 14 and the stop is stopped down to a preset aperture value. Also, the counter-clockwise rotation of the switch lever 18 causes the brushes 22a and 22b to slide on the base plate 21 and, at the end of the counter-clockwise rotation of the lever 18, that is, when the lever 12, the lever 17 and the switch lever 18 have come to their respective positions indicated by phantom lines, the brush 22b contacts the pattern 23b and thereby conducts, and the switch SW1 assumes its ON position. Accordingly, the stop is stopped down to a predetermined aperture value and substantially simultaneously therewith, the switch SW1 becomes closed.

When the switch SW1 assumes its ON position, the change-over circuit A4 intercepts the multi metering output P6 and supplies to the operating circuit A8 the metering output P5 of the photodiode SPD5 disposed at the center of the light-receiving portion 9. The then metering output P5 is the metering output based on the light when the stop has already been stopped down to a predetermined aperture value and therefore, in the operating circuit A8, it is not necessary to add the aperture value information. Accordingly, the number of stop-down steps P7=0 is input from the second information setting circuit A5 to the operating circuit A8 through the elimination circuit A6. In this case, in the operating circuit A8, the shutter speed value P9 is determined on the basis of the metering output P5 of the photodiode SPD5 and the film speed value P8 of the third information setting circuit A7 and is put out. That is, when stop-down metering is to be effected by operating the operating lever 17, exposure is determined on the basis of the so-called spot metering or center-weighted metering in which the central area of the photo-taking picture plane is metered. In the embodiment of FIG. 3, if, in addition to the switch SW1, a change-over switch SW2 operable independently of the operating lever 17 is added as indicated by broken lines and design is made such that when this change-over switch SW2 assumes its ON position, the change-over circuit A4 operates to put out the metering output P5 of the central area metering circuit, instead of the proper metering output P6 of the multi metering circuit, to the operating circuit A8, then central area metering will also become possible with the stop open.

We claim:

1. In a camera provided with an automatic aperture control device for stopping down a stop of a photo-taking lens from its open condition to a predetermined aperture value in response to the photographing operation, a metering device comprising:
    (a) first metering means for effecting metering while dividing an object into a plurality of areas through said stop and producing a first metering output which determines the exposure of the object on the basis of a plurality of photoelectric outputs corresponding to said areas;
    (b) second metering means for metering the central partial area of said object through said stop and producing a second metering output corresponding to said partial area;
    (c) means operable by the operator for manually stopping down the stop of said photo-taking lens which is in its open condition to a preset aperture value independently from said automatic aperture control device; and
    (d) change-over means including means responsive to said manually stopping down means and selecting said first metering output when the stop of said photo-taking lens is in its open condition and selecting said second metering output when said stop has been stopped down to said preset aperture value by said manually stopping down means.

2. A metering device according to claim 1, wherein said manually stopping down means is displaced between an open position for maintaining the stop of said photo-taking lens in its open condition and a stop-down position for enabling said stop to be stopped down, and said responsive means includes means for detecting the displacement of said manually stopping down means.

3. A metering device according to claim 1, further comprising means for operating the exposure on the basis of one of said first metering output and said second metering output which has been selected by said change-over means.

4. A metering device according to claim 3, wherein said exposure operating means includes means for preparing output information corresponding to the difference between the aperture value in the open condition of the stop of said photo-taking lens and said preset aperture value and effects said operation on the basis of said first metering output and said output information when said first metering output is selected, and said device further comprises means for eliminating said output information when said stop has been stopped down by said manually stopping down means.

5. A metering device of a camera provided with means for presetting a stop of a photo-taking lens, said device comprising:
    (a) first metering means for effecting metering while dividing an object into a plurality of areas through said stop and producing a first metering output which determines the exposure of the object on the basis of a plurality of photoelectric outputs correspondence to said areas;
    (b) second metering means for metering a determined area of said object through said stop and producing a second metering output corresponding to said determined area;
    (c) means operable by the operator for manually stopping down the stop of said photo-taking lens which is in its open condition to a preset aperture value according to said preset means independently from a photographing operation; and
    (d) change-over means including means responsive to said manually stopping down means and selecting said first metering output when said manually stopping down means has not been operated and selecting said second metering output when said manually stopping down means is operated by said operator.

6. A metering device according to claim 5, wherein said manually stopping down means is displaced between an open position for maintaining the stop of said photo-taking lens in its open condition and a stop-down position for enabling said stop to be stopped down, and said responsive means selects said first metering output and said second metering output when said manually stopping down means is displaced in said open position and said stop-down position respectively.

7. In a camera provided with an automatic aperture control device for stopping down a stop of a photo-taking lens from its open condition to a predetermined apeture value in response to the photographing operation, a metering device comprising:
    (a) metering means for receiving a light beam passed through the stop of said photo-taking lens and producing a photoelectric output corresponding to the quantity of received light;
    (b) means for putting out first information corresponding to the aperture value in the open condition of the stop of said photo-taking lens;
    (c) means operable by the operator for manually stopping down the stop of said photo-taking lens which is in its open condition to a preset aperture value independently from said photographing operation;
    (d) means for putting out second information corresponding to the difference between the aperture value in the open condition of the stop of said photo-taking lens and said preset aperture value; and
    (e) means responsive to said manually stopping down means to eliminate said second information when said manually stopping down means is operated.

8. A metering device according to claim 7, further comprising means for operating the exposure on the basis of said photoelectric output, said first information and said second information.

* * * * *